(12) United States Patent
Lee et al.

(10) Patent No.: US 9,047,443 B2
(45) Date of Patent: Jun. 2, 2015

(54) DATA FEDERATION SYSTEM AND METHOD FOR SOCIALITY STORAGE SERVICE IN CLOUD COMPUTING

(71) Applicant: Konkuk University Industrial Cooperation Corp., Seoul (KR)

(72) Inventors: Han Ku Lee, Seoul (KR); Hyo Gun Yoon, Daejeon (KR); Yun Cui, Seoul (KR); Myoung Jin Kim, Seoul (KR)

(73) Assignee: KONKUK UNIVERSITY INDUSTRIAL COOPERATION CORP., Seoul (KR)

( * ) Notice: Subject to any disclaimer, the term of this patent is extended or adjusted under 35 U.S.C. 154(b) by 245 days.

(21) Appl. No.: 13/721,667

(22) Filed: Dec. 20, 2012

(65) Prior Publication Data

US 2014/0122886 A1    May 1, 2014

(30) Foreign Application Priority Data

Oct. 30, 2012    (KR) ........................ 10-2012-0121072

(51) Int. Cl.
*H04L 29/06*     (2006.01)
*G06F 21/00*     (2013.01)
*H04L 29/08*     (2006.01)

(52) U.S. Cl.
CPC ............. *G06F 21/00* (2013.01); *H04L 67/1095* (2013.01); *H04L 67/1097* (2013.01); *H04L 63/08* (2013.01)

(58) Field of Classification Search
CPC ......... G06F 15/16; G06F 21/00; H04L 63/08; H04L 67/1095; H04L 67/1097
USPC .......................................... 713/171
See application file for complete search history.

(56) References Cited

U.S. PATENT DOCUMENTS

2013/0060839 A1 *   3/2013   Van Biljon et al. ........... 709/203

* cited by examiner

*Primary Examiner* — Dant Shaifer Harriman
*Assistant Examiner* — Abiy Getachew
(74) *Attorney, Agent, or Firm* — Morris, Manning & Martin, LLP; Christopher W. Raimund

(57) ABSTRACT

Provided is a data federation system for a sociality storage service in cloud computing, the data federation system including an instance management unit to collect instance information from a cloud system for integrating cloud storage services provided to individuals, a service authentication unit to authenticate a state of the cloud storage services using the collected instance information, a storage synchronization unit to integrate cloud storages to collect data of the authenticated cloud storage services, and an index management unit to organize the collected data based on a state value of at least one of a file and a folder in the integrated cloud storage.

17 Claims, 11 Drawing Sheets

DATA FEDERATION SYSTEM AND METHOD FOR SOCIALITY STORAGE SERVICE IN CLOUD COMPUTING

CROSS-REFERENCE TO RELATED APPLICATION

This application claims the priority benefit of Korean Patent Application No. 10-2012-0121072, filed on Oct. 30, 2012, in the Korean Intellectual Property Office, the disclosure of which is incorporated herein by reference.

BACKGROUND

1. Field of the Invention

Exemplary embodiments of the present invention relate to a data federation system and method for a sociality storage service configured by integrating different types of cloud storage spaces.

2. Description of the Related Art

Cloud computing is a combination of data as a service (DaaS) and utility computing, and relays on software as a service (SaaS) and a utility computing model. The SaaS, a cousin of DaaS, is a software delivery model in which a software infrastructure is provided to a virtual storage space of an individual user, and utility computing refers to an ability to meter an offered service, involving a user and an administrator monitoring an amount of storage for storage management.

In cloud computing, private data management may be enabled on demand using various devices, recently using a smart phone. Using a smart phone, a service for accessing a large capacity storage device, a data sharing service, and the like, may be provided.

Data management in cloud computing is based on virtualization of an independent service space, and a federation technology for data federation on various enterprise-level clouds is proposed.

SUMMARY

According to an aspect of the present invention, there is provided a data federation system for a sociality storage service in cloud computing, the data federation system including an instance management unit to collect instance information from a cloud system for integrating cloud storage services provided to individuals, a service authentication unit to authenticate a state of the cloud storage services using the collected instance information, a storage synchronization unit to integrate cloud storages to collect data of the authenticated cloud storage services, an index management unit to organize the collected data based on a state value of at least one of a file and a folder in the integrated cloud storage, a monitoring unit to monitor a state of a sociality storage service, and an integrated sharing unit to share data of the sociality storage services allocated to the individuals and to integrate the sociality storage services.

The instance management unit may include a service request unit to request a service by a user accessing an Internet for the sociality storage services provided to the individuals, an instance generation unit to generate an instance for the requested service, an instance calling unit to call the generated instance for each cloud storage service to configure the sociality storage service, an instance authentication unit to authenticate the called instances by monitoring the state of the cloud storage services to ensure security of the called instances, an instance registration unit to register the authenticated instances in the sociality storage service, an instance recording unit to manage the registered instances and an instance of the sociality storage service for the user, an instance submission unit to initialize the sociality storage service by integrating the registered instances, and a service execution unit to generate a process for executing the service requested by the user.

The instance management unit may include the instance authentication unit to verify the state of the instance information for each individual to integrate the cloud storage services provided to the individuals.

The instance authentication unit may include an instance information unit to pre-process the collected instance information, an instance encoding unit to ensure security of the sociality storage service, an instance transmitting/receiving unit to transmit and receive data to and from the cloud system from which the instance information is collected, a public instance authentication unit to determine a public instance using the collected instance information and to verify an authentication key, a private instance authentication unit to determine a private instance using the collected instance information and to verify an authentication key, an instance decoding unit to recover the encrypted instance, an instance node generation unit to generate a service node including the authenticated instance information, and a service node execution unit to prepare the service requested by the user from the generated node.

The instance authentication unit may include an authentication service execution unit to execute user authentication based on the collected instance information, a private key authentication unit to authenticate a private key based on the collected instance information, a service key authentication unit to authenticate the collected instance information for the user, an instance key authentication unit to authenticate data and service information using the collected instance information, an index generation unit to collect data from the authenticated cloud storage, a synchronization instance generation unit to synchronize the authenticated cloud storage with the service requested by the user, a monitoring instance generation unit to monitor a state value of instance information of the synchronized cloud storage, a storage sharing instance generation unit to share the synchronized cloud storage, and a synchronization execution unit to execute the sociality storage service by integrating instance information of the synchronized cloud storage.

The storage synchronization unit may include a synchronization node execution unit to generate a node for connecting the cloud storage spaces collected for the sociality storage service, a synchronization instance node generation unit to generate a synchronized instance node by synchronizing the instance information collected from the synchronized node, an index synchronization unit to record data in the generated instance node, a storage mount unit to represent the cloud storage spaces as one storage space in the generated instance node, a storage sharing index unit to share data in the sociality storage configured through the generated instance node, and a synchronization processing unit to synchronize commands of the cloud storage services through the generated instance node.

The index management unit may include an index calling unit to configure an integrated index by calling and synchronizing the requested services, a storage mount unit to connect the cloud storages at the instance node, an overlap inspection unit to process overlap in the connected data at the instance node, an integrated virtual storage management unit to virtualize the integrated storage absent overlap, a provisioning service unit to enable provisioning of the virtual storage service, a storage management unit to manage the data in the sociality storage, an index interface management unit to exchange the index of the data and the index of the folder in the sociality storage, and an index processing unit to set the index and the state value suitably for a device of the user.

The monitoring unit may include an interface calling unit to call an interface for monitoring the sociality storage service, a service instance calling unit to call and control a state value necessary for integrating the instances, a synchronization instance calling unit to synchronize and monitor spaces for the sociality storage service and the cloud storage services, an index sharing instance calling unit to monitor a state of data sharing in the space for the sociality storage service, a user instance calling unit to control and monitor the state of the sociality storage service and a state value of the space for the sociality storage service, an instance integrating unit to report the state of the sociality storage service to an administrator, a monitoring interface unit to display the state value of the sociality storage service separately, and a monitoring execution unit to execute intuitive control and management of the sociality storage service.

The integrated sharing unit may include an integrated instance calling unit to execute integrated management of the cloud storage services, a user service generation unit to enable data sharing with an additional cloud storage service, a user monitoring service unit to monitor and control a state value of the additional cloud storage service, a service provisioning unit to execute instance management and service information control for the additional cloud storage service, a user information management unit to manage state information of the user and data information produced by providing the cloud storage service, an instance synchronization management unit to process intuitive control and integration of space and service for reconfigured sociality storage, a service interface unit to output and monitor the state value of the reconfigured sociality storage service, an administrator service interface unit to provide an administration function for the user, and to monitor a state value of data sharing for the additional cloud storage service, and a service providing unit to provide the sociality storage service to the device of the user.

According to another aspect of the present invention, there is provided a method of operating a data federation system for a sociality storage service in cloud computing, the method including collecting instance information for integrating data and spaces of private cloud storage services provided to individuals, implementing data federation of the private cloud storage services to configure a sociality storage service, controlling the sociality storage service, generating the sociality storage service to devices of the individuals concurrently, managing a state value of a service resource of the sociality storage service and the sociality storage services allocated to the individuals, configuring a library for operating the data federation system for the sociality storage service, and incorporating the service resource in the library.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
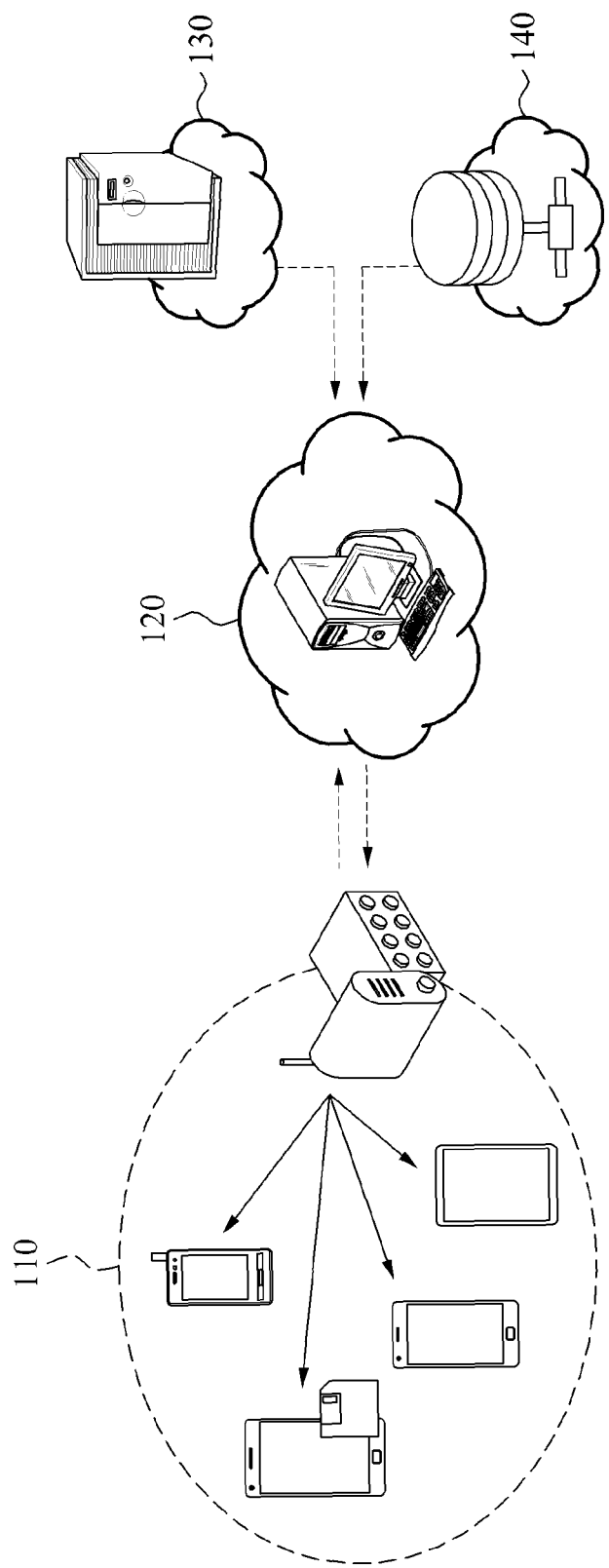
FIG. 1 is a diagram illustrating a network structure of a data federation system for a sociality storage service in cloud computing according to an exemplary embodiment of the present invention.

Reference will now be made in detail to exemplary embodiments of the present invention, examples of which are illustrated in the accompanying drawings.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein. Like reference numerals refer to the like elements throughout.

FIG. 1 is a diagram illustrating a network structure of a data federation system for a sociality storage service in cloud computing according to an exemplary embodiment of the present invention.

The data federation system according to an exemplary embodiment of the present invention may provide a sociality storage service by connecting and integrating private cloud storages distributed on the web and in smart devices in cloud computing.

The data federation system may provide a data sharing service in which data recorded in private cloud storage spaces under at least one network environment and a storage virtualization environment may be shared and managed integratedly through a sociality storage service.

Referring to FIG. 1, the data federation system for a sociality storage service may include a service area 110, a cloud federation system 120, a private cloud 130, and a public cloud 140.

The service area 110 may correspond to an area in which a private storage service environment of a user is established. At least one network environment may be included in the service area 110. A service state of the user may be verified using a device for verifying such state.

The cloud federation system 120 may correspond to a system for providing a sociality storage service and a data sharing service.

The private cloud 130 may correspond to a cloud designed for a user personally.

The public cloud 140 may correspond to a cloud in which a service provider provides resources, storage, and the like.

The service area 110 may include various network environments, and may allow a user to access a service fast and easily at any location.

The service area 110 may be in which a service may be processed by communication methods available in various network environments, for example, a wireless or wired network environment, a third-generation/fourth-generation (3G)/(4G) mobile environment, and other network environments.

The cloud federation system 120 may provide a communication protocol for maintaining communication in various network environments, and may provide a function of calling and managing an instance of a cloud storage system to enable a user and an administrator to monitor a service state of the user.

The private cloud 130 may correspond to a system from which an individual user may be provided with a private cloud storage service as needed, and may provide a storage instance for interworking with the cloud federation system.

The public cloud 140 may correspond to a system designed to provide a public cloud storage service to allow an individual and an enterprise to share and manage data, and may provide a storage instance for interworking with the cloud federation system.

Figure 2:
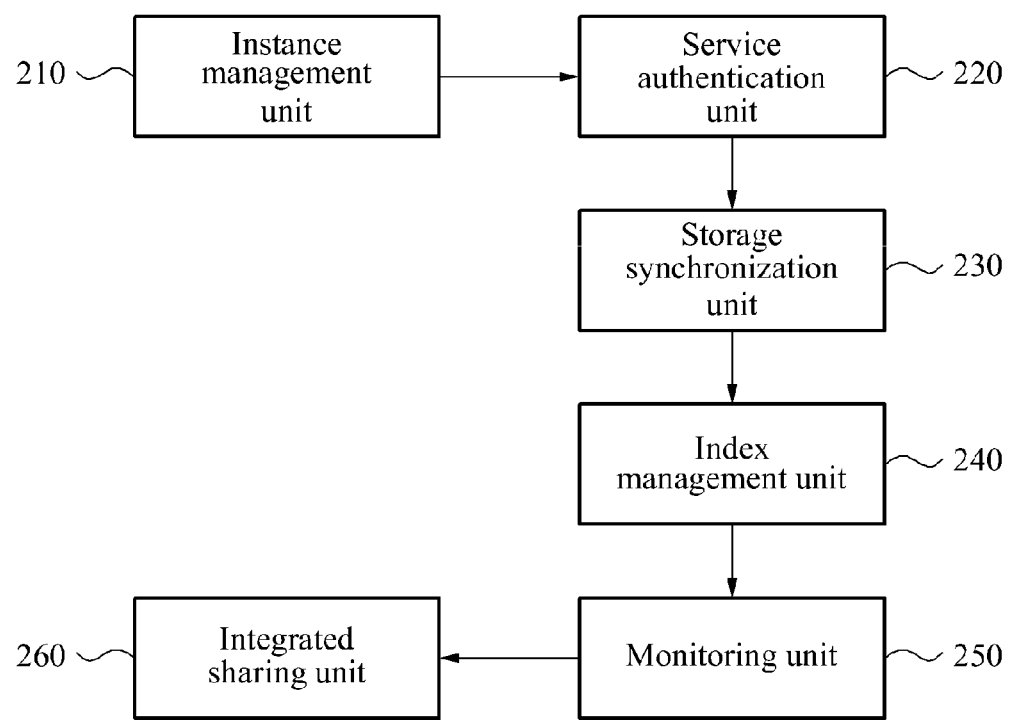
FIG. 2 is a block diagram illustrating a structure of a data federation system for a sociality storage service in cloud computing according to an exemplary embodiment of the present invention.

FIG. 2 is a block diagram illustrating a structure of a data federation system for a sociality storage service in cloud computing according to an exemplary embodiment of the present invention.

Referring to FIG. 2, the data federation system may include an instance management unit 210, a service authentication unit 220, a storage synchronization unit 230, an index management unit 240, a monitoring unit 250, and an integrated sharing unit 260.

The instance management unit 210 may collect instance information from a cloud system for integrating cloud storage services provided to individuals. The instance management unit 210 may call an instance of a system for configuring sociality storage from systems for providing cloud storage services in various networks, and may manage the called instances.

The service authentication unit 220 may authenticate a state of the cloud storage services using the collected instance information.

The service authentication unit 220 may authenticate user information and service information for each cloud storage service requested by a user and may collect service key information to provide a sociality storage service.

The storage synchronization unit 230 may integrate cloud storages to collect data of the authenticated cloud storage services.

The storage synchronization unit 230 may synchronize and control the cloud storage services authenticated by the service authentication unit 220 to maintain unity between the cloud storage systems.

The index management unit 240 may organize the collected data based on a state value of at least one of a file and a folder in the sociality storage.

The index management unit 240 may control storage space arrangement and an interface to output the data in the sociality storage onto a user interface.

The monitoring unit 250 may monitor a state of the sociality storage service.

The monitoring unit 250 may monitor the state of the sociality storage service using an index and the collected instance information, and may provide a limited service to the user and an administrator separately.

The integrated sharing unit 260 may share data of the sociality storage services allocated to individuals, and may integrate the sociality storage services.

The integrated sharing unit 260 may configure an interface for data sharing through the sociality storage service.

Figure 3:
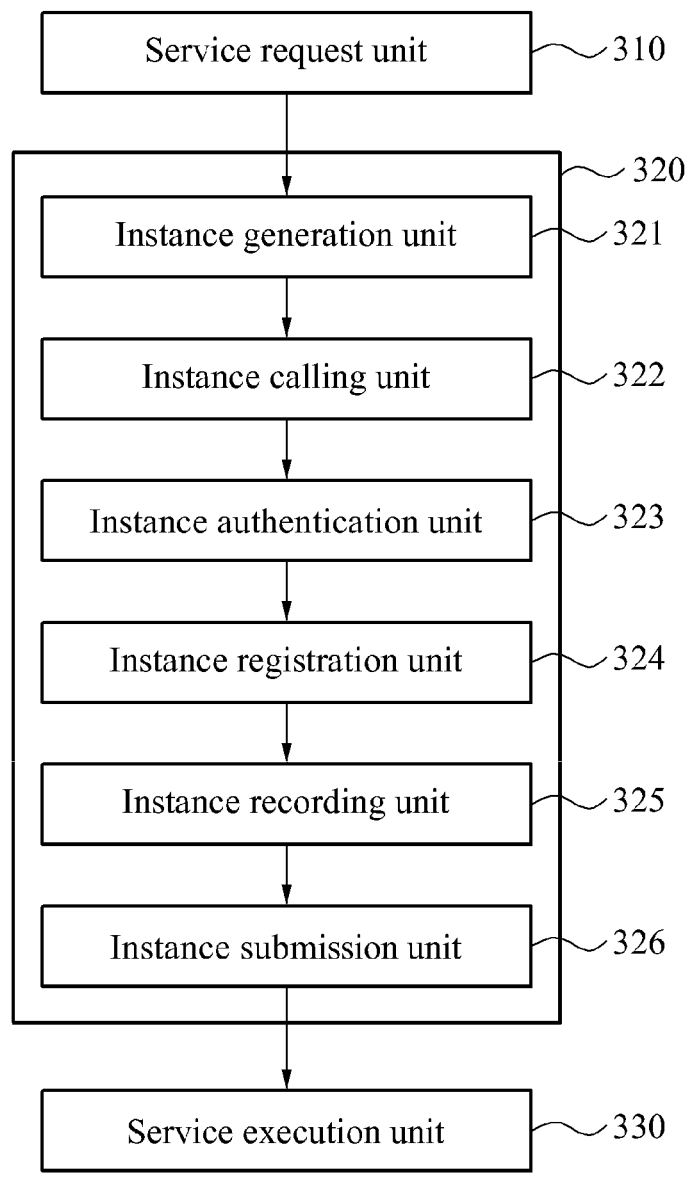
FIG. 3 is a block diagram illustrating a structure of an instance management unit according to an exemplary embodiment of the present invention.

FIG. 3 is a block diagram illustrating a structure of an instance management unit 300 according to an exemplary embodiment of the present invention.

Referring to FIG. 3, the instance management unit 300 may include a service request unit 310, an instance management processing unit 320, and a service execution unit 330.

The service request unit 310 may request a service by a user accessing an Internet for the sociality storage services provided to individuals.

The service request unit 310 may verify the service request by the user, and may request collection of the necessary information.

The instance management processing unit 320 may call and manage an instance for configuring the sociality storage service from each cloud storage system in response to the request by the user.

The instance management processing unit 320 may include an instance generation unit 321, an instance calling unit 322, an instance authentication unit 323, an instance registration unit 324, an instance recording unit 325, and an instance submission unit 326.

The instance generation unit 321 may generate an instance for the requested service.

The instance generation unit 321 may generate and control an initial instance for configuring the sociality storage service for the user.

The instance calling unit 322 may call the generated instance for each cloud storage service to configure the sociality storage service.

The instance calling unit 322 may call instance information necessary for configuring the sociality storage service for the user from each cloud storage system.

The instance authentication unit 323 may authenticate the called instances by monitoring the state of the cloud storages to ensure security of the called instances. The instance authentication unit 323 may monitor the service state to maintain the called instance of each cloud storage service securely.

The instance registration unit 324 may register the authenticated instances in the sociality storage service. The instance registration unit 324 may perform instance registration to manage the called instances along with an instance of the sociality storage service.

The instance recording unit 325 may manage the registered instances and the instance of the sociality storage service for the user. The instance recording unit 325 may record an additional function of a key that may be generated by registering an integrated instance.

The instance submission unit 326 may initialize the sociality storage service by integrating the registered instances.

The instance submission unit 326 may submit the registered instances to the cloud system to configure an interface for the sociality storage service.

The service execution unit 330 may generate a process for executing the service requested by the user. The service execution unit 330 may verify the state of the generated instance and the called instances, and may execute the interface for the sociality storage service.

Figure 4:
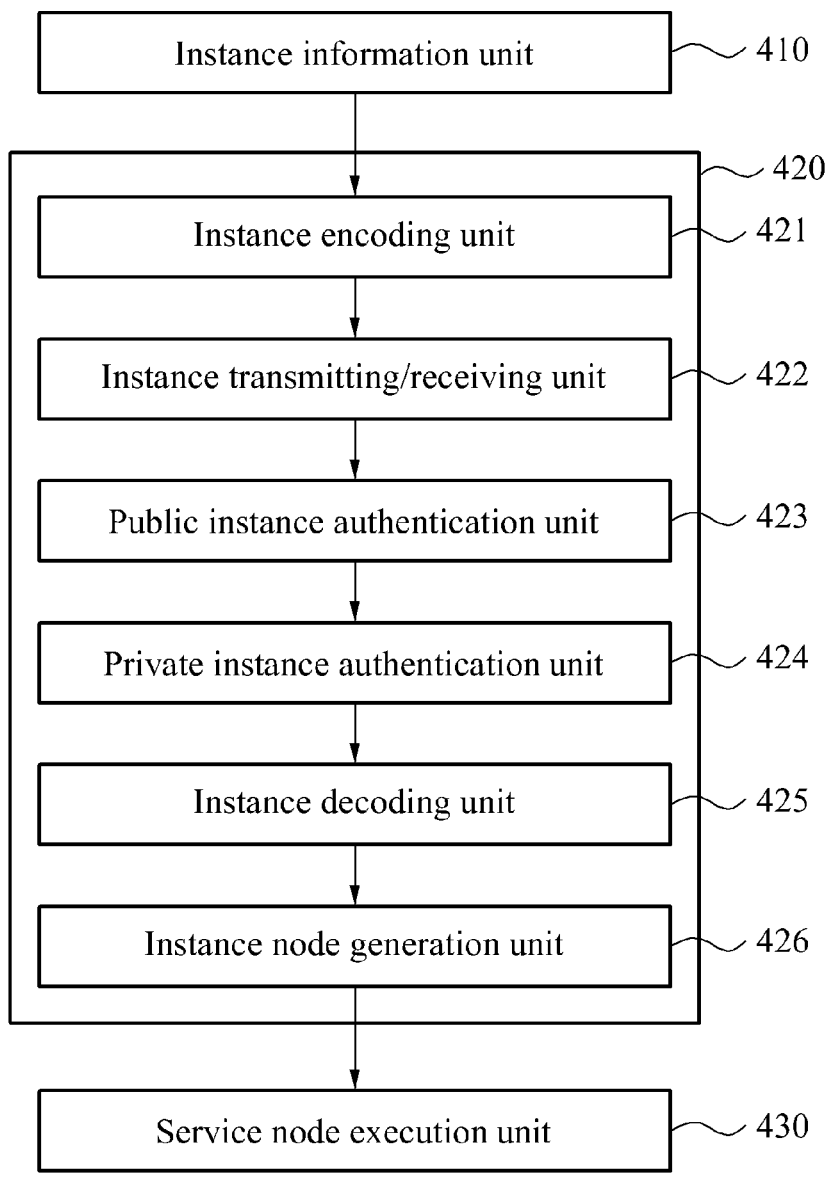
FIG. 4 is a block diagram illustrating a structure of an instance authentication unit for instance management according to an exemplary embodiment of the present invention.

FIG. 4 is a block diagram illustrating a structure of an instance authentication unit 400 for instance management according to an exemplary embodiment of the present invention.

Referring to FIG. 4, the instance management unit may include the instance authentication unit 400 to verify the state of the instance information for each individual to integrate the cloud storage services provided to individuals.

The instance authentication unit 400 may include an instance information unit 410, an instance authentication processing unit 420, and a service node execution unit 430.

The instance information unit 410 may pre-process the collected instance information. The instance information unit 410 may include instance information for each cloud storage service called for the sociality storage service.

The instance authentication processing unit 420 may process an error in the state values of the instances collected from each cloud storage service.

The instance authentication processing unit 420 may include an instance encoding unit 421, an instance transmitting/receiving unit 422, a public instance authentication unit 423, a private instance authentication unit 424, an instance decoding unit 425, and an instance node generation unit 426.

The instance encoding unit 421 may ensure security of the sociality storage service.

For example, the instance encoding unit 421 may encrypt an instance code for secure data transmission and reception to and from each cloud storage system.

The instance transmitting/receiving unit 422 may transmit and receive data to and from each cloud storage system from which the instance information is collected.

The instance transmitting/receiving unit 422 may establish a network connection to fetch data from each cloud storage system using the encrypted instance, and may maintain the network connection continuously.

The public instance authentication unit 423 may determine a public instance using the collected instance information, and may verify an authentication key.

The public instance authentication unit 423 may authenticate a cloud storage system providing a public storage service among the cloud storage systems.

The private instance authentication unit 424 may determine a private instance using the collected instance information, and may verify an authentication key.

The private instance authentication unit 424 may authenticate a cloud storage system providing a private storage service among the cloud storage systems.

The instance decoding unit 425 may recover the encrypted instance.

The instance decoding unit 425 may convert the encrypted instance into original instance for instance integration.

The instance node generation unit 426 may generate a service node including the authenticated instance information.

The instance node generation unit 426 may configure the service node necessary for the sociality storage service by integrating the instances of the cloud storage systems.

The service node execution unit 430 may prepare the service requested by the user from the generated node. The service node execution unit 430 may verify and execute the service node for the sociality storage service.

Figure 5:
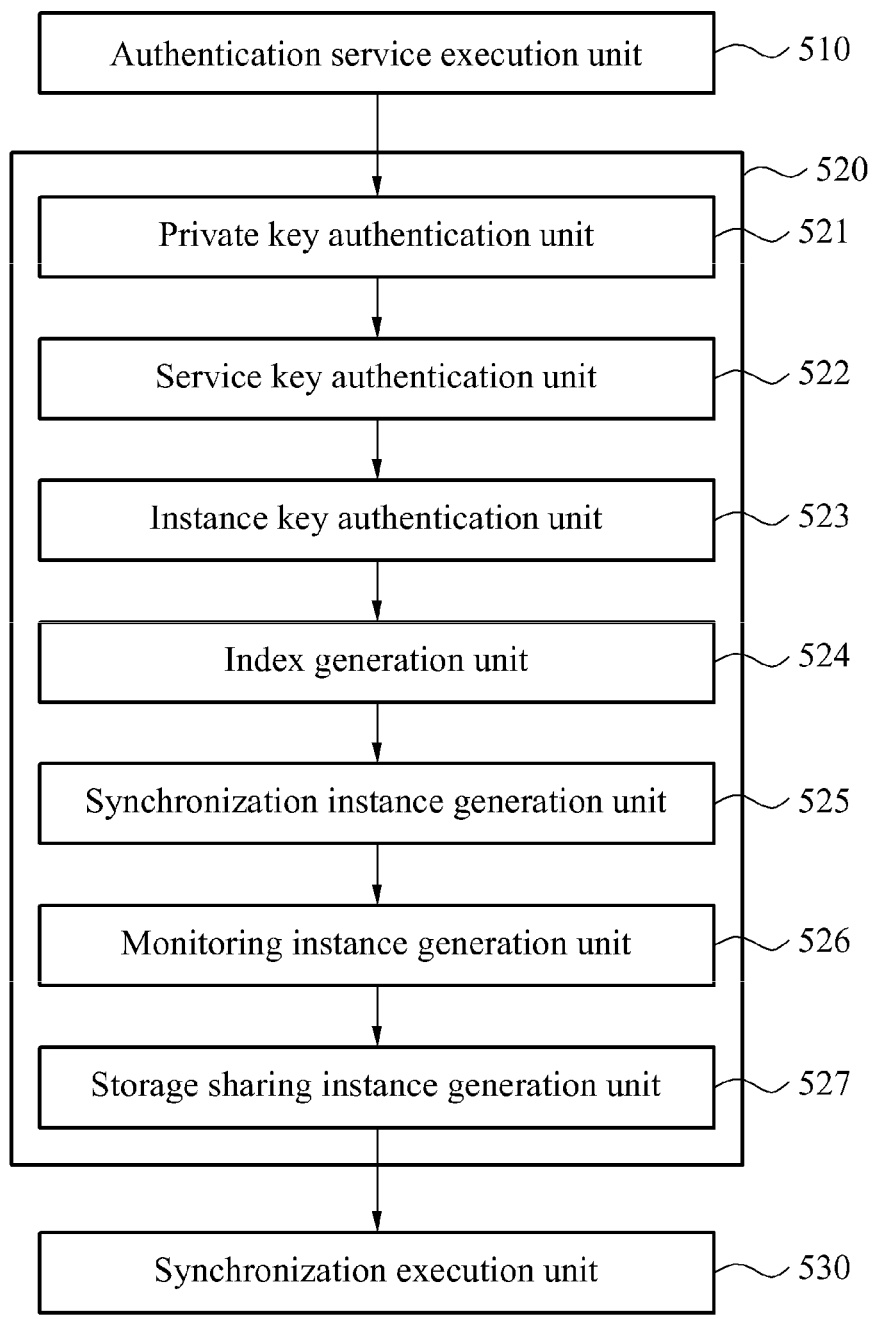
FIG. 5 is a block diagram illustrating a structure of a service authentication unit according to an exemplary embodiment of the present invention.

FIG. 5 is a block diagram illustrating a structure of a service authentication unit 500 according to an exemplary embodiment of the present invention.

Referring to FIG. 5, the service authentication unit 500 may include an authentication service execution unit 510, a service authentication execution unit 520, and a synchronization execution unit 530.

The authentication service execution unit 510 may execute user authentication based on the collected instance information. The authentication service execution unit 510 may use instance information for each cloud storage service called for the sociality storage service.

The service authentication execution unit 520 may include a private key authentication unit 521, a service key authentication unit 522, an instance key authentication unit 523, an index generation unit 524, a synchronization instance generation unit 525, a monitoring instance generation unit 526, and a storage sharing instance generation unit 527.

The private key authentication unit 521 may authenticate a private key based on the collected instance information. The private key authentication unit 521 may generate and authenticate a private key for personal information protection and service authentication for each cloud storage system to provide a customized sociality storage service.

The service key authentication unit 522 may authenticate the collected instance information for the user. The service key authentication unit 522 may authenticate the instance information collected for the sociality storage service to use the private key and the service key in the data federation system.

The instance key authentication unit 523 may authenticate data and service information using the collected instance information. The instance key authentication unit 523 may authenticate and control instance keys collected from each cloud storage system by the instance authentication unit.

The index generation unit 524 may provide an interface for configuring and controlling data of the sociality storage service to collect data from the authenticated cloud storages.

The synchronization instance generation unit 525 may synchronize the authenticated cloud storages with the service requested by the user. The synchronization instance generation unit 525 may generate and control an interface instance for synchronizing each cloud storage service and the sociality storage service.

The monitoring instance generation unit 526 may monitor a state value of instance information of the synchronized cloud storage. The monitoring instance generation unit 526 may generate and control an interface for monitoring a synchronized state for space and data of a cloud storage connected to the synchronization instance.

The storage sharing instance generation unit 527 may share the synchronized cloud storage, and may generate and control an interface for sharing data through the sociality storage service.

The synchronization execution unit 530 may execute the sociality storage service by integrating instance information of the synchronized cloud storage.

Figure 6:
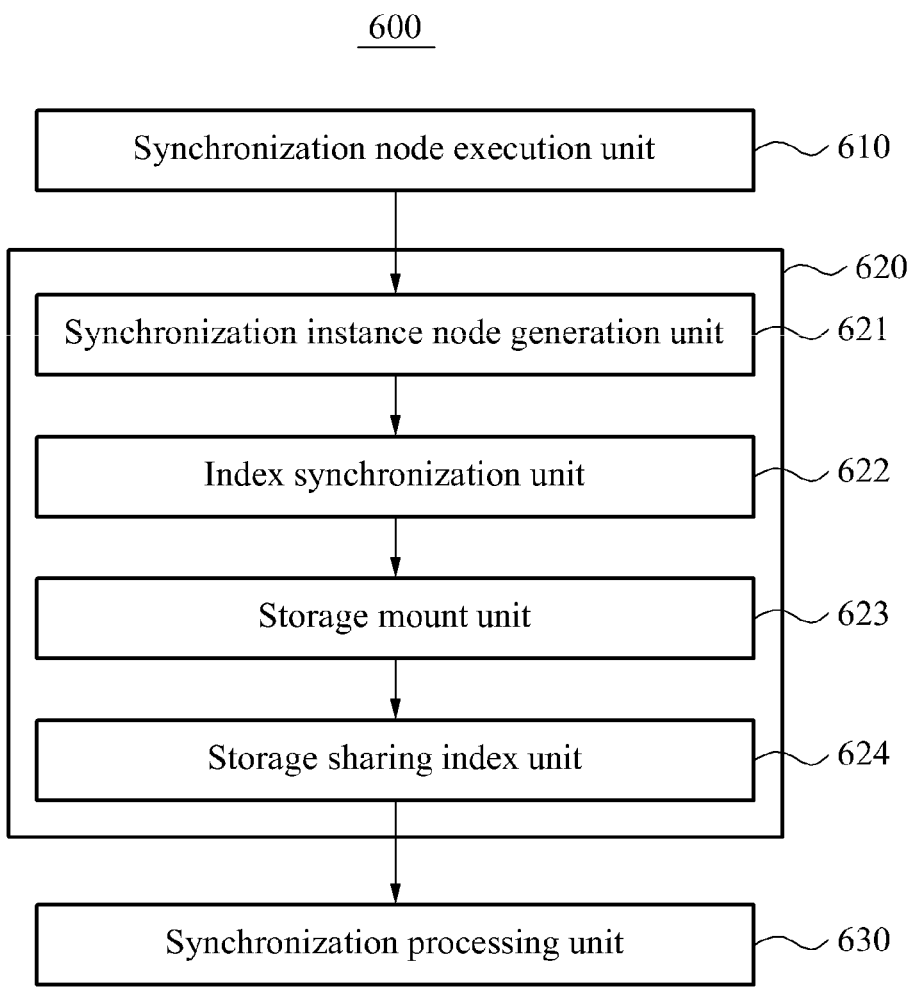
FIG. 6 is a block diagram illustrating a structure of a storage synchronization unit according to an exemplary embodiment of the present invention.

FIG. 6 is a block diagram illustrating a structure of a storage synchronization unit 600 according to an exemplary embodiment of the present invention.

Referring to FIG. 6, the storage synchronization unit 600 may include a synchronization node execution unit 610, a storage synchronization processing unit 620, and a synchronization processing unit 630.

The synchronization node execution unit 610 may execute an operation of integrating structures, data information values, and control state values of the cloud storage services to provide the sociality storage service. The synchronization node execution unit 610 may generate a node for connecting the cloud storages collected for the sociality storage service.

The storage synchronization processing unit 620 may provide a standard for integrating and sharing the authenticated cloud storages.

The storage synchronization processing unit 620 may include a synchronization instance node generation unit 621, an index synchronization unit 622, a storage mount unit 623, and a storage sharing index unit 624.

The synchronization instance node generation unit 621 may generate a synchronized instance node by synchronizing the instance information collected from the synchronized node.

The synchronization instance node generation unit 621 may synchronize locations and information of the instance nodes to synchronize the instance of the sociality storage service with the instances of the cloud storage services.

The index synchronization unit 622 may record data in the generated instance node.

The index synchronization unit 622 may reconstruct an index of data in a form of a hash table to provide the sociality storage service.

The index synchronization unit 622 may register and manage a state value of data and may organize data and folders collected through each instance in a sequential order to provide the sociality storage service.

The storage mount unit 623 may represent each cloud storage as one space in the generated instance node.

For example, the storage mount unit 623 may express each cloud storage in a form of a folder to represent each cloud storage as one space.

As another example, the storage mount unit 623 may depict each cloud storage service space in a form of a folder, and may organize data in the integrated space at a predetermined interval.

The storage mount unit 623 may store data in the integrated space separately based on a data capacity and a recording type, and may record and control a state value of separate data in a space table.

The storage sharing index unit 624 may share data in the sociality storage configured through the generated instance node.

The storage sharing index unit 624 may share the data and data in the folders in the mounted storage.

The storage sharing index unit 624 may control sharing of the mounted storage in response to the request by the user.

The storage sharing index unit 624 may record, manage, and control the data and data in the folders stored in the mounted storage in a space table.

The synchronization processing unit 630 may synchronize commands of the cloud storage services through the generated instance node.

The synchronization processing unit 630 may integrate and control processing commands for maintaining the mounted cloud storage services uniformly.

Figure 7:
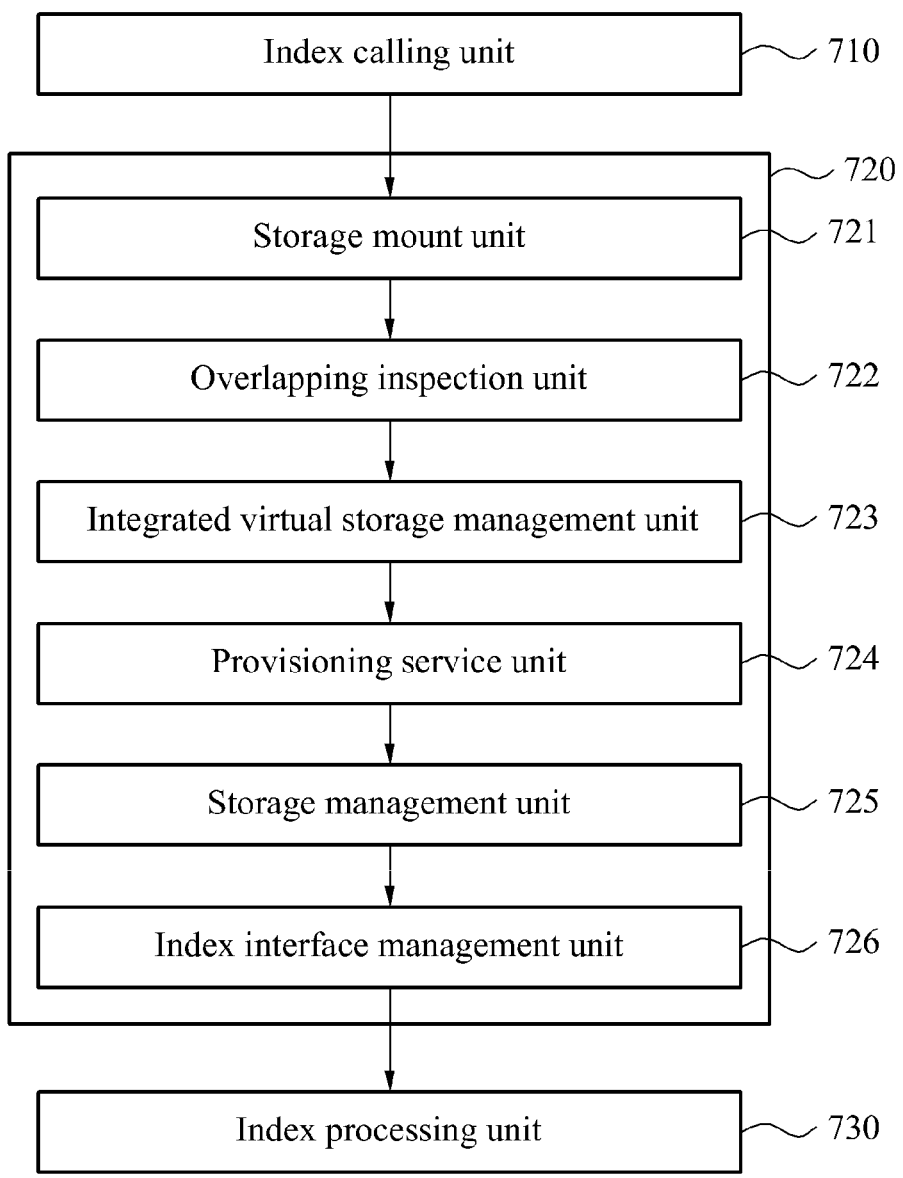
FIG. 7 is a block diagram illustrating a structure of an index management unit according to an exemplary embodiment of the present invention.

FIG. 7 is a block diagram illustrating a structure of an index management unit 700 according to an exemplary embodiment of the present invention.

Referring to FIG. 7, the index management unit 700 may include an index calling unit 710, an index management processing unit 720, and an index processing unit 730.

The index calling unit 710 may configure an integrated index by calling and synchronizing the requested services. As an example, the index calling unit 710 may configure the integrated index by calling and synchronizing the indexes of the collected data and the indexes of data of the folders of the cloud storage services called for the sociality storage service.

The index management processing unit 720 may generate and control an index table for managing the indexes of the data and folders or directories in the integrated space by the storage synchronization unit.

The index management processing unit 720 may include a storage mount unit 721, an overlap inspection unit 722, an integrated virtual storage management unit 723, a provisioning service unit 724, a storage management unit 725, and an index interface management unit 726.

The storage mount unit 721 may mount the called space and data for storage in the data federation system for the sociality storage service.

The storage mount unit 721 may connect each cloud storage at the instance node.

The overlap inspection unit 722 may maintain data having uniqueness by inspecting and processing overlap in the mounted data and folders or directories at the instance node.

The integrated virtual storage management unit 723 may virtualize the integrated storage absent data overlap. The integrated virtual storage management unit 723 may configure and manage a virtual storage service and may manage a state value of overlap processing.

The provisioning service unit 724 may enable provisioning of the virtual storage service by providing the user with an index interface for the sociality storage service.

The storage management unit 725 may manage the data in the sociality storage. The storage management unit 725 may manage and control the data and folders or directories of the provisioned sociality storage service securely.

The index interface management unit 726 may provide and manage an index interface for an additional file or data and an additional space provided to the sociality storage service. The index interface management unit 726 may exchange index information of the data and index information of the folder in the sociality storage.

The index processing unit 730 may process the indexes of the data in the sociality storage service. The index processing unit 730 may set the index and the state value suitably for the device of the user.

Figure 8:
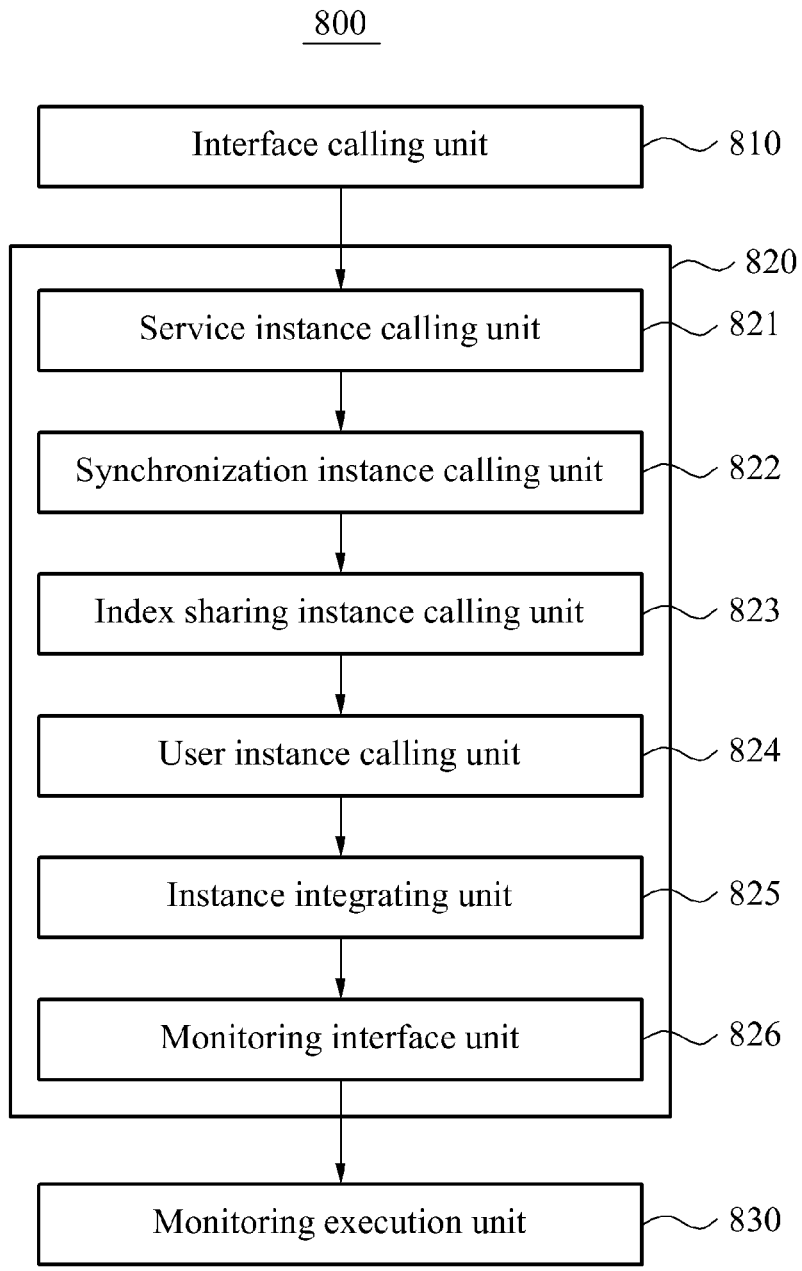
FIG. 8 is a block diagram illustrating a structure of a monitoring unit according to an exemplary embodiment of the present invention.

FIG. 8 is a block diagram illustrating a structure of a monitoring unit 800 according to an exemplary embodiment of the present invention.

Referring to FIG. 8, the monitoring unit 800 may include an interface calling unit 810, a monitoring processing unit 820, and a monitoring execution unit 830.

The interface calling unit 810 may call interface information for monitoring the state values of the sociality storage service and the cloud system from a user and an administrator. The interface calling unit 810 may call the interface for monitoring the sociality storage service.

The monitoring processing unit 820 may configure, manage, and control the called interface information for monitoring.

The monitoring processing unit 820 may include a service instance calling unit 821, a synchronization instance calling unit 822, an index sharing instance calling unit 823, a user instance calling unit 824, an instance integrating unit 825, and a monitoring interface unit 826.

The service instance calling unit 821 may call and control the state value necessary for instance integration. The service instance calling unit 821 may call and control the state value needed to integrate the instances for the data federation system.

The synchronization instance calling unit 822 may synchronize and monitor the storage spaces for the sociality storage service and each cloud storage service. The synchronization instance calling unit 822 may call and control the state value of storage space synchronization between the system for the sociality storage service and the cloud storage systems.

The index sharing instance calling unit 823 may monitor a state of data sharing in the space for the sociality storage service. The index sharing instance calling unit 823 may manage and control the index on which the state value of data sharing through the sociality storage service provided by the data federation system is reflected.

The user instance calling unit 824 may control and monitor the state of the sociality storage service and the state value of the space for the sociality storage service, and may call and control the user interface for recording and managing the state value of the service user.

The instance integrating unit 825 may report the state of the sociality storage service to the administrator, and may integrate and control the called instances.

The monitoring interface unit 826 may provide the collected state value of the sociality storage service to each display of the user and the administrator. The monitoring interface unit 826 may display the state value of the sociality storage service separately.

The monitoring execution unit 830 may execute intuitive control and management of the sociality storage service. The monitoring execution unit 830 may reflect, monitor, and output the state value changing in real time.

Figure 9:
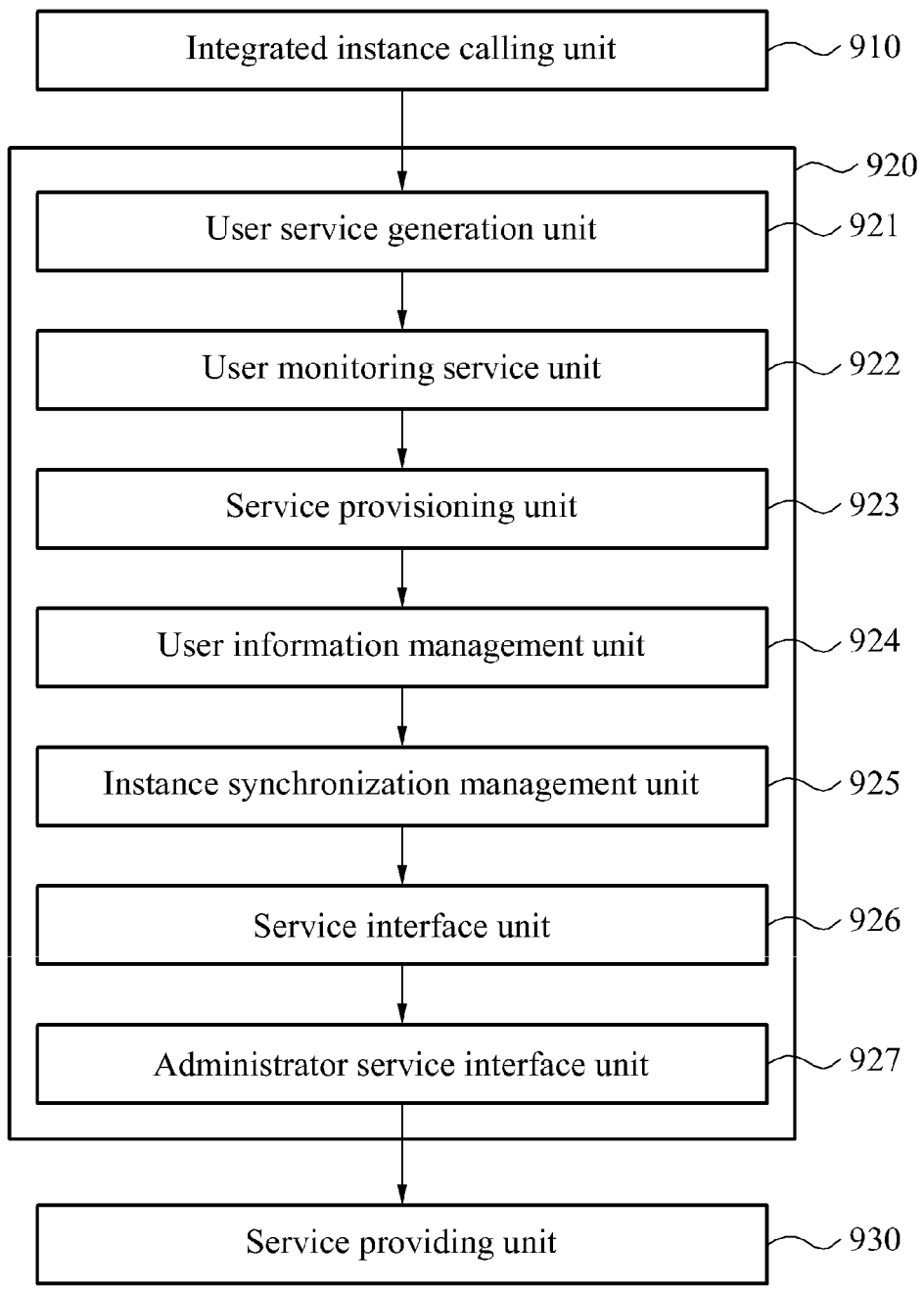
FIG. 9 is a block diagram illustrating a structure of an integrated sharing unit according to an exemplary embodiment of the present invention.

FIG. 9 is a block diagram illustrating a structure of an integrated sharing unit 900 according to an exemplary embodiment of the present invention.

Referring to FIG. 9, the integrated sharing unit 900 may include an integrated instance calling unit 910, an integrated sharing processing unit 920, and a service providing unit 930.

The integrated instance calling unit 910 may be provided to manage the cloud storage services integratedly. The integrated instance calling unit 910 may call integrated interface information for providing the sociality storage service to the user along with the monitoring service.

The integrated sharing processing unit 920 may process and control data sharing through the sociality storage service.

The integrated sharing processing unit 920 may include a user service generation unit 921, a user monitoring service unit 922, a service provisioning unit 923, a user information management unit 924, an instance synchronization management unit 925, a service interface unit 926, and an administrator service interface unit 927.

The user service generation unit 921 may control a storage service added by the service user and the data sharing service. The user service generation unit 921 may enable data sharing with the additional cloud storage service.

The user monitoring service unit 922 may monitor and control a state value of the additional cloud storage service.

The service provisioning unit 923 may manage and control an instance and service information of the additional cloud storage service. The service provisioning unit 923 may request and control information for configuring the additional cloud storage service.

The user information management unit 924 may incorporate a service result in user information, and may manage and control the user information. The user information management unit 924 may manage user information and state information produced by providing the additional cloud storage service.

The instance synchronization management unit 925 may execute intuitive control and integration of space and service for the additional cloud storage service to reconfigure the sociality storage service. The instance synchronization management unit 925 may manage and control an instance of the additional cloud storage service and the instances of the existing cloud storage services integratedly.

The service interface unit 926 may output and monitor a state value of the reconfigured sociality storage service. The service interface unit 926 may output a state value of sharing and a state value of the user for the reconfigured sociality storage service.

The administrator service interface unit 927 may output a state value of the system for the reconfigured sociality storage service, and may manage the state value of the user for the reconfigured sociality storage service. The administrator service interface unit 927 may provide an administration function for the service user, and may monitor the state value of data sharing for the additional cloud storage service.

The service providing unit 930 may provide the sociality storage service to the device of the user. The service providing unit 930 may allow the user to manage the sociality storage service by providing the user with shared data and a display for monitoring.

According to an embodiment of the present invention, the data federation system for the sociality storage service may provide an optimum cloud computing service with mobility, immediacy, and spatiality.

According to another embodiment of the present invention, the data federation system for the sociality storage service may have applications for information processing services in a smart network environment, a wired or wireless network environment, and the like, a smart business service, a multimedia service, a home management service, a customized contents management service, and the like.

According to still another embodiment of the present invention, the data federation system for the sociality storage service may provide a customized cloud computing service satisfying user requirements.

According to further another embodiment of the present invention, the data federation system for the sociality storage service may implement a cloud computing service in various forms.

According to another embodiment of the present invention, the data federation system for the sociality storage service may interwork with different types of cloud computing services using various devices through one service model.

According to still another embodiment of the present invention, the data federation system for the sociality storage service may establish an integrated service environment in real time under the control of different operating systems (OSs).

According to further another embodiment of the present invention, the data federation system for the sociality storage service may provide an optimum cloud computing service using various terminals.

Figure 10:
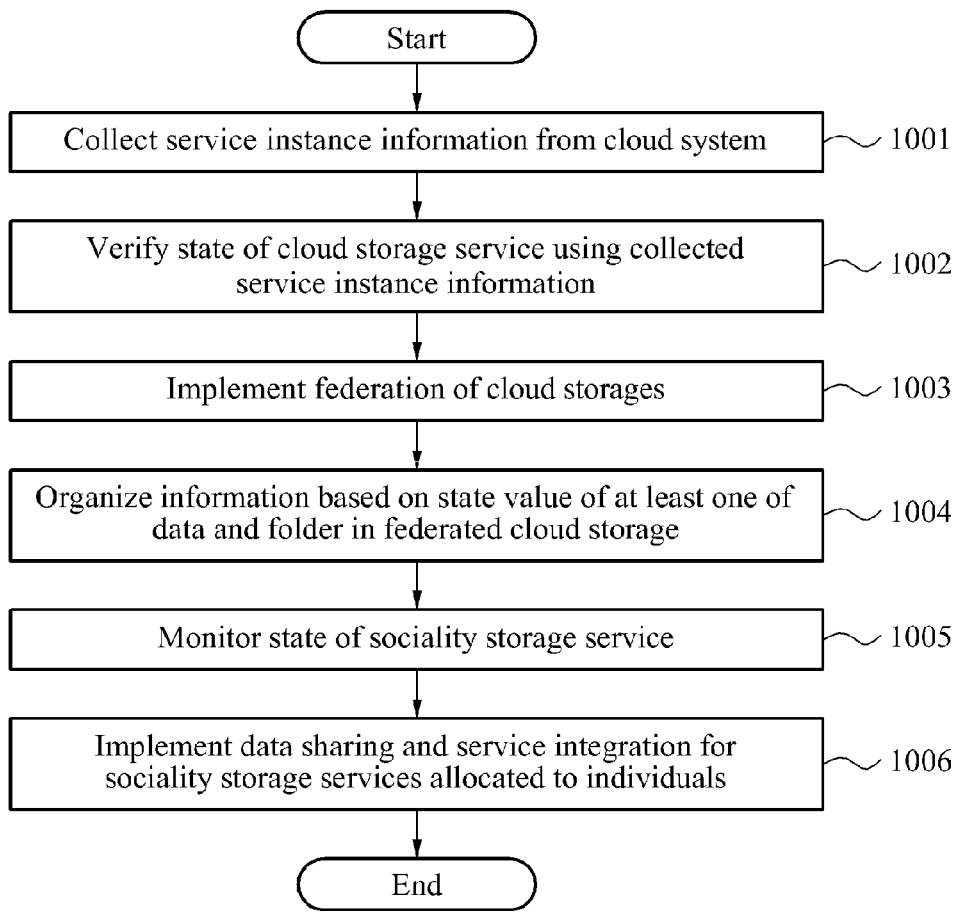
FIG. 10 is a flowchart illustrating a method of operating a data federation system for a sociality storage service in cloud computing according to an exemplary embodiment of the present invention.

FIG. 10 is a flowchart illustrating a method of operating a data federation system for a sociality storage service in cloud computing according to an exemplary embodiment of the present invention.

Referring to FIG. 10, in operation 1001, the data federation system may collect instance information from a cloud system for integrating cloud storage services provided to individuals.

The data federation system may authenticate instance information by determining a public instance using the collected instance information and by verifying an authentication key.

In operation 1002, the data federation system may verify a state of the cloud storage service using the collected instance information.

For example, the data federation system may verify the state of the cloud storage service by authenticating user information and service information and by collecting service key information for each cloud storage system requested by a user to provide a sociality storage service.

In operation 1003, the data federation system may integrate cloud storage services to collect data of the authenticated cloud storage services.

In operation 1004, the data federation system may organize the collected data based on a state value of at least one of a file and a folder in sociality storage.

As an example, the data federation system may control storage space arrangement and an interface to output the data in the sociality storage onto a user interface.

In operation 1005, the data federation system may monitor a state of the sociality storage service. In this instance, the data federation system may monitor the state of the sociality storage service using an index and the collected instance information, and may provide a limited service to the user and an administrator separately.

In operation 1006, the data federation system may enable data sharing through the sociality storage service, and may integrate sociality storage services allocated to individuals.

The data federation system may configure an interface for data sharing through the sociality storage service.

Figure 11:
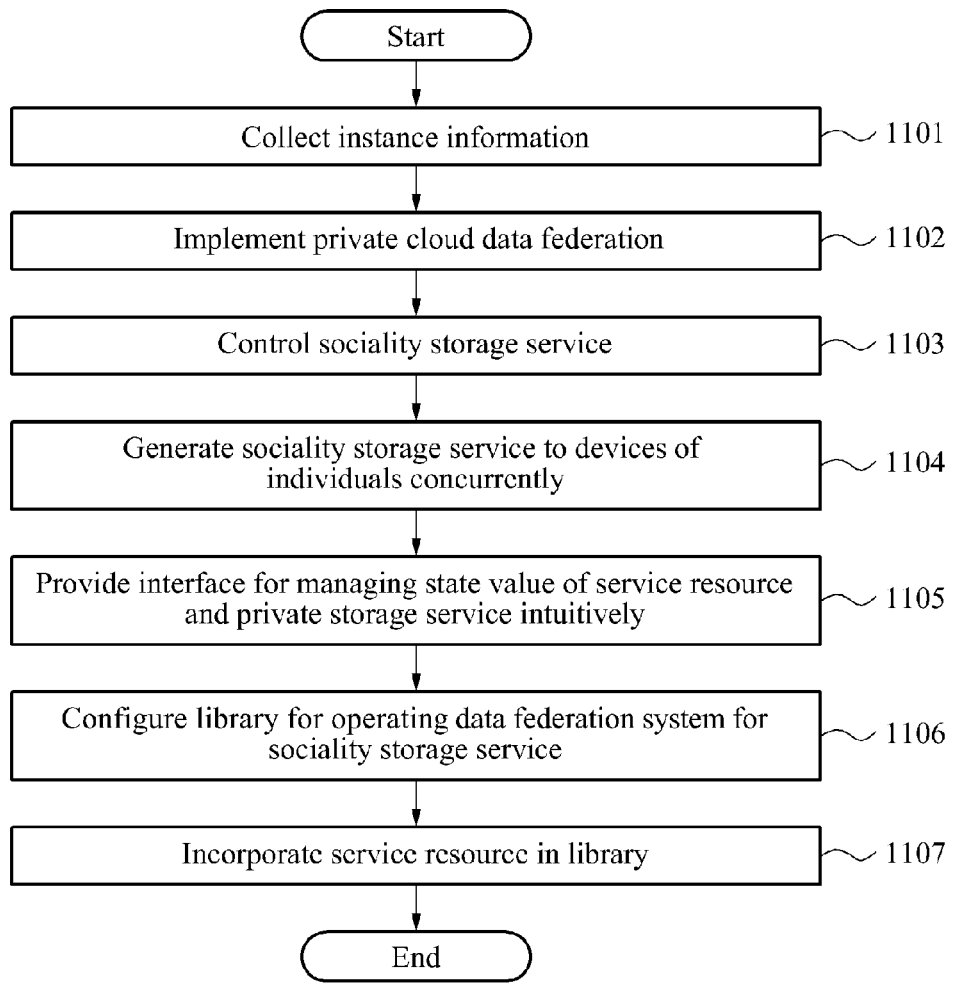
FIG. 11 is a flowchart illustrating a method of operating a data federation system for a sociality storage service in cloud computing according to another exemplary embodiment of the present invention.

FIG. 11 is a flowchart illustrating a method of operating a data federation system for a sociality storage service in cloud computing according to another exemplary embodiment of the present invention.

Referring to FIG. 11, in operation 1101, the data federation system may collect instance information for integrating spaces and data of private cloud storage services.

The data federation system may authenticate instance information by determining a public instance using the collected instance information and by verifying an authentication key.

In operation 1102, the data federation system may implement data federation of the private cloud storage services to configure a sociality storage service.

In operation 1103, the data federation system may control the sociality storage service.

In operation 1104, the data federation system may generate the sociality storage service onto devices of individuals concurrently.

In operation 1105, the data federation system may manage a state value of a service resource of the sociality storage service and the sociality storage services allocated to the individuals.

The data federation system may provide an interface for managing the sociality storage services allocated to the individuals intuitively.

In operation 1106, the data federation system may configure a library for operating the data federation system for the sociality storage service.

In operation 1107, the data federation system may incorporate the service resource in the library.

According to an embodiment of the present invention, the data federation system and method may provide a service for maintaining a large capacity storage space by managing separate cloud data services integratedly.

According to another embodiment of the present invention, the data federation system and method may determine a customized cloud software service for integrating independent cloud software services, and may determine a service state of a cloud service user, and user requirements and service configuration for data space distribution and service processing.

According to still another embodiment of the present invention, the data federation system and method may provide a sociality storage service that may connect different cloud storage services and may allow data sharing.

According to yet another embodiment of the present invention, the data federation system and method may monitor each cloud storage service in real time to control and manage a sociality storage service for storage federation and data sharing.

According to another embodiment of the present invention, the data federation system and method may provide a sociality storage service satisfying sociality requirements, user requirements, monitoring, and administration.

According to still another embodiment of the present invention, the data federation system and method may provide a customized sociality storage service, a data sharing service, and a monitoring service.

According to yet another embodiment of the present invention, the data federation system and method may enable sharing of data recorded in each cloud storage based on a folder or directory structure of a sociality storage service.

According to another embodiment of the present invention, the data federation system and method may monitor a state of a sociality storage service for each cloud storage, and may request an additional service for an insufficient storage space.

According to still another embodiment of the present invention, the data federation system and method may provide an interface for an administrator to monitor a state of a sociality storage service and to take a prompt response to a risk factor.

According to further another embodiment of the present invention, the data federation system and method may enable an administrator to verify, in response to a request for an additional service, a state of a cloud service user and take a necessary action.

According to another embodiment of the present invention, the data federation system and method may be applied to a system for a document management service, for example, a medical data management system, an electronic document management system, and the like, using a smart home service.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard discs, floppy discs, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A data federation system for a sociality storage service in cloud computing, wherein the data federation system is configured to:
   collect instance information from a cloud system for integrating cloud storage services provided to individuals;
   authenticate a state of the cloud storage services using the collected instance information;
   integrate cloud storages to collect data of the authenticated cloud storage services; and
   organize the collected data based on a state value of at least one of a file and a folder in the integrated cloud storage;
   wherein the system configured to integrate cloud storages is configured to:
   generate a synchronized node for connecting the cloud storage spaces collected for the sociality storage service;
   generate a synchronized instance node by synchronizing the instance information collected from the synchronized node;
   record data in the generated instance node;
   represent the cloud storage space as one storage space in the generated instance node;
   share data in the sociality storage configured through the generated instance node; and
   synchronize commands of the cloud storage services through the generated instance node.

2. The data federation system of claim 1, wherein the data federation system is further configured to:
   monitor a state of a sociality storage service.

3. The data federation system of claim 2, wherein the system configured to monitor a state of a sociality storage service is configured to:
   call an interface for monitoring the sociality storage service;
   call and control a state value necessary for integrating the instances;
   synchronize and monitor spaces for the sociality storage service and the cloud storage services;
   monitor a state of data sharing in the space for the sociality storage service;
   control and monitor the state of the sociality storage service and a state value of the space for the sociality storage service;
   report the state of the sociality storage service to an administrator;
   display the state value of the sociality storage service separately; and
   execute intuitive control and management of the sociality storage service.

4. The data federation system of claim 1, wherein the data federation system is further configured to:
   share data of the sociality storage services allocated to the individuals and to integrate the sociality storage services.

5. The data federation system of claim 4, wherein the system configured to share data of the sociality storage services allocated to the individuals and to integrate the sociality storage services is configured to:
   execute integrated management of the cloud storage services;
   enable data sharing with an additional cloud storage service;
   monitor and control a state value of the additional cloud storage service;
   execute instance management and service information control for the additional cloud storage service;
   manage state information of the user and data information produced by providing the cloud storage service;
   process intuitive control and integration of space and service for reconfigured sociality storage;
   output and monitor the state value of the reconfigured sociality storage service;
   provide an administration function for the user, and to monitor a state value of data sharing for the additional cloud storage service; and
   provide the sociality storage service to the device of the user.

6. The data federation system of claim 1, wherein the data federation system configured to collect instance information is configured to:
   request a service by a user accessing an Internet for the sociality storage services provided to the individuals;
   generate an instance for the requested service;
   call the generated instance for each cloud storage service to configure the sociality storage service;
   authenticate the called instances by monitoring the state of the cloud storages to ensure security of the called instances;
   register the authenticated instances in the sociality storage service;
   manage the registered instances and an instance of the sociality storage service for the user;
   initialize the sociality storage service by integrating the registered instances; and
   generate a process for executing the service requested by the user.

7. The data federation system of claim 1, wherein the system configured to collect instance information is configured to verify the state of the instance information for each individual to integrate the cloud storage services provided to the individuals.

8. The data federation system of claim 7, wherein the system configured to verify the state of the instance information is configured to:
   pre-process the collected instance information;
   ensure security of the sociality storage service;
   transmit and receive data to and from the cloud system from which the instance information is collected;
   determine a public instance using the collected instance information and to verify an authentication key;
   determine a private instance using the collected instance information and to verify an authentication key;
   recover the encrypted instance;
   generate a service node including the authenticated instance information; and
   prepare the service requested by the user from the generated node.

9. The data federation system of claim 1, wherein the system configured to verify the state of the instance information is configured to:
   execute user authentication based on the collected instance information;
   authenticate a private key based on the collected instance information;

authenticate the collected instance information for the user;

authenticate data and service information using the collected instance information;

collect data from the authenticated cloud storage;

synchronize the authenticated cloud storage with the service requested by the user;

monitor a state value of instance information of the synchronized cloud storage;

share the synchronized cloud storage; and execute the sociality storage service by integrating instance information of the synchronized cloud storage.

10. The data federation system of claim 1, wherein the system configured to organize the collected data is configured to:

configure an integrated index by calling and synchronizing the requested services;

connect the cloud storages at the instance node;

process overlap in the connected data at the instance node;

virtualize the integrated storage absent overlap;

enable provisioning of the virtual storage service;

manage the data in the sociality storage;

exchange the index of the data and the index of the folder in the sociality storage; and set the index and the state value suitably for a device of the user.

11. The data federation system of claim 1, wherein the data federation system comprises a service area, a cloud federation system, a private cloud and a public cloud.

12. The data federation system of claim 11, wherein the service area corresponds to a private storage service environment of a user.

13. The data federation system of claim 11, wherein at least one network environment is provided in the service area.

14. The data federation system of claim 11, wherein the at least one network environment is a network environment selected from the group consisting of a wireless network environment, a wired network environment, a mobile environment and combinations thereof.

15. A method of operating a data federation system for a sociality storage service in cloud computing, the method comprising:

collecting instance information for integrating data and spaces of private cloud storage services provided to individuals;

implementing data federation of the private cloud storage services to configure a sociality storage service;

controlling the sociality storage service;

generating the sociality storage service to devices of the individuals concurrently;

managing a state value of a service resource of the sociality storage service and the sociality storage services allocated to the individuals;

configuring a library for operating the data federation system for the sociality storage service; and incorporating the service resource in the library.

16. The method of claim 15, wherein the collecting of the instance information comprises authenticating the instance information by determining a public instance using the collected instance information and by verifying an authentication key.

17. A non-transitory computer-readable recording medium comprising a program for implementing the method of claim 15.

* * * * *